(12) United States Patent
Yetukuri et al.

(10) Patent No.: US 11,070,664 B2
(45) Date of Patent: Jul. 20, 2021

(54) METHODS AND SYSTEMS EMPLOYING ORIENTATION OF PHONE TO ADJUST PHYSICAL OBJECTS

(71) Applicant: Lear Corporation, Southfield, MI (US)

(72) Inventors: Arjun V. Yetukuri, Rochester Hills, MI (US); David A. Hein, Sterling Heights, MI (US); Samuel Hanlon, Livonia, MI (US)

(73) Assignee: Lear Corporation, Southfield, MI (US)

( * ) Notice: Subject to any disclaimer, the term of this patent is extended or adjusted under 35 U.S.C. 154(b) by 519 days.

(21) Appl. No.: 15/843,359

(22) Filed: Dec. 15, 2017

(65) Prior Publication Data
US 2019/0191023 A1    Jun. 20, 2019

(51) Int. Cl.
| | |
|---|---|
| *H04W 24/00* | (2009.01) |
| *H04M 1/725* | (2021.01) |
| *H04Q 9/00* | (2006.01) |
| *G05D 3/10* | (2006.01) |
| *H04W 4/02* | (2018.01) |

(52) U.S. Cl.
CPC ............ *H04M 1/7253* (2013.01); *G05D 3/10* (2013.01); *H04Q 9/00* (2013.01); *H04W 4/026* (2013.01); *H04M 1/72569* (2013.01); *H04Q 2213/13104* (2013.01)

(58) Field of Classification Search
CPC ..... H04W 4/021; H04W 4/023; H04W 4/026; H04W 4/027; H04W 4/04; H04W 4/043; H04W 4/08; H04W 4/14; H04W 4/21; H04W 52/0254
See application file for complete search history.

(56) References Cited

U.S. PATENT DOCUMENTS

| | | | |
|---|---|---|---|
| 8,346,432 B2 | 1/2013 | Van Wiemeersch et al. | |
| 8,624,719 B2 | 1/2014 | Klose et al. | |
| 8,694,203 B2 | 4/2014 | Chen et al. | |
| 8,880,240 B2 | 11/2014 | Grimm et al. | |
| 2010/0233957 A1 | 9/2010 | Dobosz | |
| 2012/0115446 A1 | 5/2012 | Gautama et al. | |

(Continued)

FOREIGN PATENT DOCUMENTS

EP     3035156 A1    6/2016

OTHER PUBLICATIONS

BMW Gesture Control, BMW 7 Series Sedan: Innovative functionality, Innovations Ahead of Their Time, Oct. 11, 2016.

(Continued)

*Primary Examiner* — Khalid Shaheed
(74) *Attorney, Agent, or Firm* — Brooks Kushman P.C.

(57) ABSTRACT

A method and system involve a controller receiving from a phone an orientation signal indicative of an orientation of the phone and adjusting an object according to the orientation of the phone. The controller is configured to select one of the parts of the object according to an initial orientation of the phone and adjust the selected part of the object in correspondence with the orientation of the phone as the orientation of the phone changes. The controller is configured to receive from the phone a control signal indicative of a user input to the phone and to adjust the object according to the user input. The object may be a vehicle seat having a first part in the form of a seat bottom and a second part in the form of a seat back. The object may be a vehicle sunroof.

20 Claims, 4 Drawing Sheets

(56) References Cited

U.S. PATENT DOCUMENTS

| | | | |
|---|---|---|---|
| 2012/0282913 A1 | 11/2012 | Kaindl et al. | |
| 2013/0109272 A1 | 5/2013 | Rindlisbacher | |
| 2013/0143593 A1 | 6/2013 | Wirola et al. | |
| 2013/0147840 A1* | 6/2013 | Seder | G06T 3/005 |
| | | | 345/633 |
| 2014/0210239 A1 | 7/2014 | Yetukuri et al. | |
| 2015/0352990 A1 | 12/2015 | Zouzal et al. | |
| 2016/0143593 A1* | 5/2016 | Fu | A61B 5/7264 |
| | | | 600/595 |
| 2016/0280097 A1 | 9/2016 | Hotary et al. | |
| 2016/0280098 A1 | 9/2016 | Frye et al. | |
| 2016/0301808 A1 | 10/2016 | Choi et al. | |
| 2016/0360115 A1* | 12/2016 | Rim | H04N 5/23293 |
| 2017/0264341 A1* | 9/2017 | Jung | H02J 50/80 |
| 2018/0024597 A1 | 1/2018 | Lindemann | |
| 2018/0082475 A1* | 3/2018 | Sharma | G06T 19/006 |
| 2018/0091924 A1* | 3/2018 | Hammerschmidt | H04S 7/304 |

OTHER PUBLICATIONS

United States Patent and Trademark Office, Non-Final Office Action of Application No. 16/188,374 (Lear 57758 PUS1), dated Dec. 16, 2019.

United States Patent and Trademark Office, Non-Final Office Action for Application No. 16/188,374 :Lear 57758 PUS1), dated Jun. 14, 2019.

* cited by examiner

METHODS AND SYSTEMS EMPLOYING ORIENTATION OF PHONE TO ADJUST PHYSICAL OBJECTS

TECHNICAL FIELD

The present invention relates to control systems having a user interface and a controller operable together for adjusting physical objects.

BACKGROUND

A vehicle includes adjustable physical objects such as seats, a sunroof, windows, etc. The vehicle further includes a control system for enabling a user such as the driver or passenger to adjust the objects. The control system includes a user interface and a controller. Typically, the user interface is in the form of buttons, knobs, touch screen, gesture control via on-board camera, and the like. The user interface receives from the user an input indicative of the way the user wants to adjust an object. The controller generates a control signal based on the user input and transmits the control signal to the object. The controller thus causes the object to be adjusted according to the user input received by the user interface.

User interfaces having buttons, knobs, or touch screens involve users directing their attention to the user interface and touching the user interface. User interfaces having gesture control involve users performing gestures which generally are non-intuitive to the users.

SUMMARY

A system includes a hand-held electronic device, such as a phone, and a controller. The phone is configured to transmit an orientation signal indicative of an orientation of the phone. The controller is configured to receive the orientation signal from the phone and to adjust an object according to the orientation of the phone.

The controller may be further configured to adjust the object in correspondence with the orientation of the phone as the orientation of the phone changes.

The controller may be further configured to select a part of the object according to an initial orientation of the phone and to adjust the selected part of the object in correspondence with the orientation of the phone as the orientation of the phone changes. The controller may be further configured to select a different part of the object according to a different initial orientation of the phone and to adjust the different part of the object in correspondence with the orientation of the phone as the orientation of the phone changes.

The controller may be further configured to select a first part of the object when an initial orientation of the phone is in a first orientation and to adjust the first part of the object in correspondence with the orientation of the phone as the orientation of the phone changes relative to the first orientation. The controller may be further configured to select a second part of the object when the initial orientation of the phone is in a second orientation and to adjust the second part of the object in correspondence with the orientation of the phone as the orientation of the phone changes relative to the second orientation.

The object may be a vehicle seat or a vehicle sunroof. The object may have multiple adjustable parts. For example, in the case of the object being a vehicle seat, a first part of the object is a vehicle seat bottom and a second part of the object is a vehicle seat back.

The phone may be further configured to transmit a selection signal indicative of a user selection of the object. The controller may be further configured to adjust the object according to the orientation of the phone after receiving the selection signal indicative of the user selection of the object. The phone may be further configured to transmit a selection signal indicative of a user selection of a second object. The controller may be further configured to adjust the second object according to the orientation of the phone after receiving the selection signal indicative of the user selection of the second object.

The phone may be further configured to transmit a control signal indicative of a user input to the phone. The controller may be further configured to receive the control signal from the phone and to adjust the object according to the user input.

The controller may be further configured to adjust the object independently of the phone.

Another system includes a phone and a controller. The phone is configured to transmit an orientation signal indicative of an orientation of the phone and to transmit a control signal indicative of a user input into the phone. The controller is configured to receive the orientation signal and the control signal from the phone, select one part of an object according to an initial orientation of the phone, and adjust the selected part of the object according to the user input.

The controller may be further configured to select a different part of the object according to a different initial orientation of the phone and to adjust the different part of the object according to the user input.

The phone may be further configured to transmit a selection signal indicative of a user selection of the object. The controller may be further configured to adjust the selected part of the object according to the user input after receiving the selection signal indicative of the user selection of the object.

The phone may be further configured to transmit a selection signal indicative of a user selection of a second object. The controller may be further configured to adjust the second object according to the user input after receiving the selection signal indicative of the user selection of the second object.

The controller may be further configured to adjust the selected part of the object in correspondence with the orientation of the phone as the orientation of the phone changes.

A method includes wirelessly receiving from a phone, by a controller, an orientation signal indicative of an orientation of the phone. The method further includes adjusting, by the controller, an object in correspondence with the orientation of the phone as the orientation of the phone changes.

The method may further include selecting, by the controller, a first part of the object when an initial orientation of the phone is in a first orientation; and adjusting, by the controller, the first part of the object in correspondence with the orientation of the phone as the orientation of the phone changes relative to the first orientation. The method may further include selecting, by the controller, a second part of the object when the initial orientation of the phone is in a second orientation; and adjusting, by the controller, the second part of the object in correspondence with the orientation of the phone as the orientation of the phone changes relative to the second orientation.

The method may further include wirelessly receiving from the phone, by the controller, a selection signal indicative of a user selection of the object; and adjusting, by the controller, the object in correspondence with the orientation of the phone as the orientation of the phone changes after receiving the selection signal indicative of the user selection of the object.

The method may further include wirelessly receiving from the phone, by the controller, a control signal indicative of a user input to the phone; and adjusting, by the controller, the object according to the user input.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
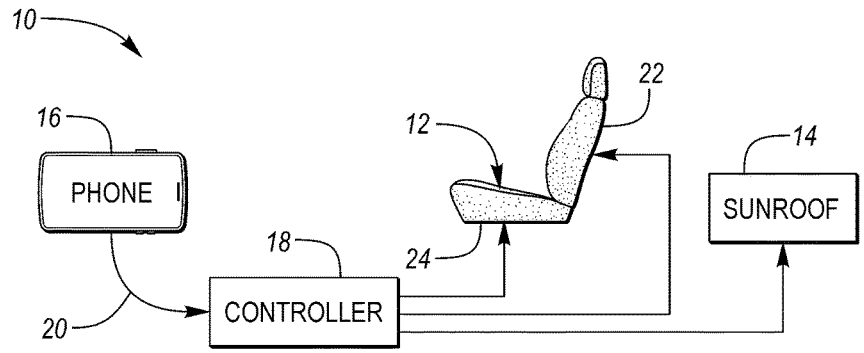
FIG. 1 illustrates a block diagram of a control system configured to adjust a physical object in correspondence with the orientation of a phone.

Referring now to FIG. 1, a block diagram of a control system 10 configured to adjust one or more physical objects 12 and 14 in correspondence with an orientation of a phone 16 is shown. As an example, control system 10 is part of a vehicle, object 12 is a seat of the vehicle, and object 14 is a sunroof of the vehicle. Seat 12 and sunroof 14 are adjustable (e.g., movable, tilt-able, alterable, modifiable, arrangeable, etc.). For instance, seat 12 is adjustable by its seat back being able to tilt forwardly and rearwardly. Sunroof 14 is adjustable by being able to move between an opened position and a closed position.

Control system 10 includes a phone 16 and a controller 18. Phone 16 functions as a user interface of control system 10. Controller 18 is configured to adjust seat 12 and sunroof 14 independently of phone 16 and in conjunction with the phone. Phone 16 and controller 18 are operable together for enabling a user such as the driver or passenger to adjust a selected one of seat 12 and sunroof 14. Controller 18 adjusts a selected one of seat 12 and sunroof 14 according to input from the user.

The user input is in the form of user manipulation of phone 16. The form of the user input includes the orientation or movement of phone 16 in space by the user. The orientation of phone 16 changes as the user moves the phone. Thus, the user input changes as the orientation of phone 16 changes. For instance, in a user interface having a knob, as the user rotates the knob the user input changes. Likewise, in the user interface involving phone 16, as the user orients or moves the phone the user input changes.

The orientation and movement of phone 16 is interpreted by the resident accelerometer and/or gyroscope in the phone. Phone 16 generates a corresponding orientation signal indicative of the orientation of the phone. Phone 16 transmits the orientation signal to controller 18 via a wireless communication line 20. Wireless communication line 20 may be a short-range wireless communication line employing, for example, Near Field Communication (NFC) or Bluetooth™ communication protocols.

Controller 18 receives the orientation signal from phone 16 via wireless communication line 20. Controller 18 determines the orientation of phone 16 from the orientation signal. Controller 18 generates a control signal for the selected one of seat 12 and sunroof 14 based on the orientation of phone 16. Controller 18 transmits the control signal to the selected one of seat 12 and sunroof 14 to adjust the selected one of the seat and the sunroof according to the orientation of phone 16. Controller 18 thus causes the selected one of seat 12 and sunroof 14 to be adjusted according to the user input. The user input, as described, is the orientation of phone 16 as the orientation of the phone changes by the user physically moving the phone.

In an embodiment, phone 16 and controller 18 are operable to enable the user to select one of seat 12 and sunroof 14 for adjusting based on an initial orientation of the phone. In this embodiment, a first initial orientation of phone 16 corresponds to the user selecting seat 12 and a second initial orientation of the phone corresponds to the user selecting sunroof 14. Thus, after phone 16 and controller 18 are set in a ready condition, the user moves the phone into an initial orientation. Phone 16 then transmits to controller 18 an orientation signal indicative of the initial orientation of the phone.

Controller 18 determines from the orientation signal whether phone 16 is in the first initial orientation or is in the second initial orientation. Controller 18 selects seat 12 when phone 16 is in the first initial orientation and selects sunroof 14 when the phone is in the second initial orientation.

Controller 18 then adjusts the selected one of seat 12 and sunroof 14 in correspondence with the orientation of phone 16 as the orientation of the phone changes while the user moves the phone relative to the initial orientation.

In an embodiment, phone 16 and controller 18 are operable to enable the user to select one of seat 12 and sunroof 14 for adjusting based on a user selection inputted by the user to the phone. In this embodiment, the user manipulates a control button or a control screen of phone 16 to enter a user selection of seat 12 or sunroof 14. Alternatively, the user speaks a voice command into phone 16 to enter a user selection of seat 12 or sunroof 14. Phone 16 then transmits to controller 18 a selection signal indicative of the user selection. When the user selection is seat 12, controller 18 adjusts the seat in correspondence with the orientation of phone 16 as the orientation of the phone changes while the user moves the phone. When the user selection is sunroof 14, controller 18 adjusts the sunroof in correspondence with the orientation of phone 16 as the orientation of the phone changes while the user moves the phone.

One or more of objects 12 and 14 may have multiple adjustable parts. For instance, seat 12 includes an adjustable seat back 22 and an adjustable seat bottom 24. Seat back 22 is adjustable, for example, in that it can tilt forward and rearward relative to seat bottom 24. Seat bottom 24 is adjustable, for example, in that it can be moved with seat 12 forward and rearward relative to the vehicle body.

In an embodiment, phone 16 and controller 18 are operable to enable the user to select one of multiple parts of a selected object for adjusting based on an initial orientation of the phone. For example, assuming the selected object is seat 12, phone 16 and controller 18 are operable to enable the user to select one of seat back 22 and seat bottom 24 for adjusting based on an initial orientation of the phone. In this embodiment, a first initial orientation of phone 16 corresponds to the user selecting seat back 22 and a second initial orientation of the phone corresponds to the user selecting seat bottom 24. Thus, after phone 16 and controller 18 are set in a ready condition, the user moves the phone into an initial orientation. Phone 16 then transmits to controller 18 an orientation signal indicative of the initial orientation of the phone.

Controller 18 determines from the orientation signal whether phone 16 is in the first initial orientation or is in the second initial orientation. Controller 18 selects seat back 22 when phone 16 is in the first initial orientation and adjusts the seat back in correspondence with the orientation of the phone as the orientation of the phone changes while the user moves the phone relative to the first initial orientation. Controller 18 selects seat bottom 24 when phone 16 is in the second initial orientation and adjusts the seat bottom 24 in correspondence with the orientation of phone 16 as the orientation of the phone changes while the user moves the phone relative to the second initial orientation.

In an embodiment, the user input includes a control input inputted by the user into phone 16. For instance, the user manipulates a control button or a control screen of phone 16 to enter a user control input. As an example, the user presses up a volume button of phone 16 to enter a first user control input and presses down a volume button of the phone to enter a second user control input. Alternatively, the user speaks a voice command into phone 16 to enter a user control input (e.g., "up" or "down"; "more" or "less"; "forward" or "backward"; "higher" or "lower"; etc.). Phone 16 then transmits to controller 18 a control signal indicative of the user control input. Controller 18 adjusts the selected one of seat 12 and sunroof 14 according to the user control input.

Figure 2A:
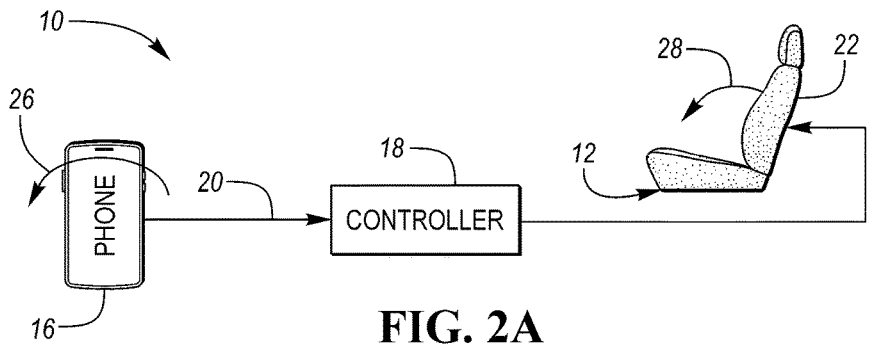
FIG. 2A illustrates a block diagram of an operation of the control system in adjusting the seat back of a seat in correspondence with the orientation of the phone.
Figure 2B:
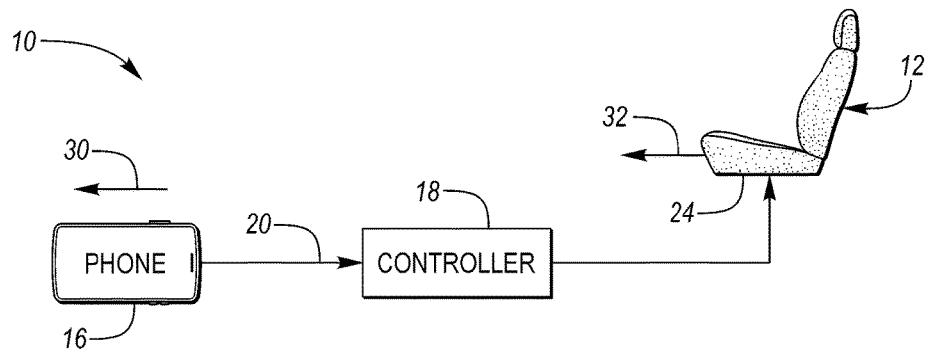
FIG. 2B illustrates a block diagram of an operation of the control system in adjusting the seat bottom of the seat in correspondence with the orientation of the phone.

Referring now to FIGS. 2A and 2B, with continual reference to FIG. 1, block diagrams of operations of control system 10 in adjusting seat back 22 of seat 12 (FIG. 2A) and in adjusting seat bottom 24 of the seat (FIG. 2B) in correspondence with the orientation of phone 16 are respectively shown. The operation of control system 10 in adjusting seat back 22, shown in FIG. 2A, includes phone 16 being positioned by the user in a first initial orientation. For instance, as shown in FIG. 2A, the first initial orientation of phone 16 involves the phone being positioned in a portrait orientation. The first initial orientation of phone 16 (i.e., the portrait orientation) is pre-defined to correspond to the user selecting seat back 22 for adjusting. Phone 16 transmits to controller 18 via wireless communication line 20 an orientation signal indicative of the phone being in the first initial orientation. Controller 18 determines from phone 16 being in the first initial orientation that seat back 22 is to be adjusted.

The user moves phone 16 relative to the first initial orientation to generate a user input for adjusting seat back 22. For instance, as shown in FIG. 2A, the user rotates phone 16 in a counter-clockwise direction, indicated by arrow 26, relative to the first initial orientation. Phone 16 transmits to controller 18 via wireless communication line 20 the orientation signal as the orientation of the phone changes. Controller 18 in turn adjusts seat back 22 in correspondence with the orientation of phone 16 as the orientation of the phone changes while the user moves the phone. For instance, as shown in FIG. 2A, seat back 22 is adjusted to tilt forward, indicated by arrow 28, as phone 16 rotates in the counter-clockwise direction.

Similarly, the operation of control system 10 in adjusting seat bottom 24, shown in FIG. 2B, includes phone 16 being positioned by the user in a second initial orientation. For instance, as shown in FIG. 2B, the second initial orientation of phone 16 involves the phone being positioned in a landscape orientation. The second initial orientation of phone 16 (i.e., the landscape orientation) is pre-defined to correspond to the user selecting seat bottom 24 for adjusting. Phone 16 transmits to controller 18 via wireless communication line 20 an orientation signal indicative of the phone being in the second initial orientation. Controller 18 determines from phone 16 being in the second initial orientation that seat bottom 24 is to be adjusted.

The user moves phone 16 relative to the second initial orientation to generate a user input for adjusting seat bottom 24. For instance, as shown in FIG. 2B, the user moves phone 16 in a right-to-left lateral direction, indicated by arrow 30, relative to the second initial orientation. Phone 16 transmits to controller 18 via wireless communication line 20 the orientation signal as the orientation of the phone changes. Controller 18 in turn adjusts seat bottom 24 in correspondence with the orientation of phone 16 as the orientation of the phone changes while the user moves the phone. For instance, as shown in FIG. 2B, seat bottom 24 (with seat 12) is adjusted to move forward, indicated by arrow 32, as phone 16 moves in the right-to-left lateral direction.

Figure 3A:
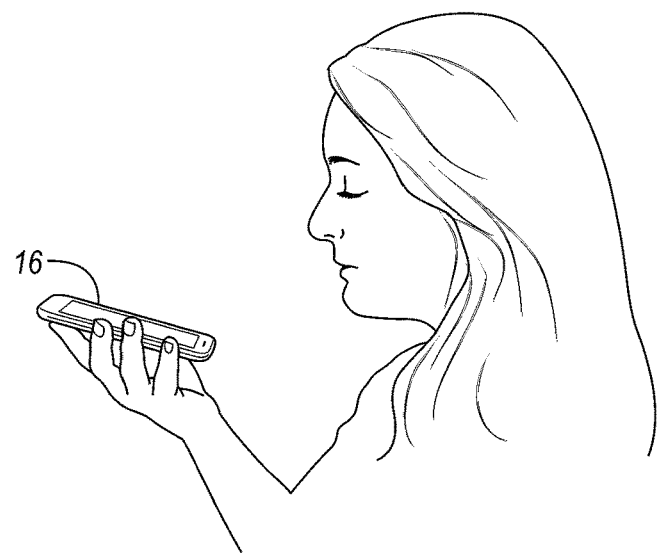
FIG. 3A illustrates a sketch depicting a step of a user using the phone to select a physical object for adjusting.
Figure 3B:
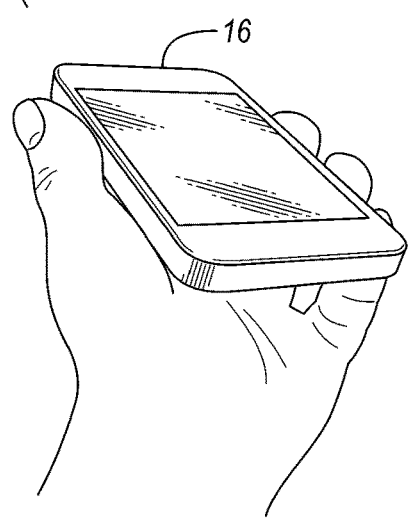
FIG. 3B illustrates a sketch depicting a step of the user moving the phone into an initial orientation to select a part or a feature of the selected object for adjusting.

Referring now to FIGS. 3A and 3B, with continual reference to FIG. 1, a sketch depicting a step of a user using phone 16 to select a physical object for adjusting and a sketch depicting a step of the user moving the phone into an initial orientation to select a part or a feature of the selected object for adjusting are shown, respectively. As shown in FIG. 3A, the user speaks a selection command into phone 16 to select a physical object for adjusting. For instance, the user speaks "select the driver seat" (or "select the passenger seat"; "select the sunroof", etc.) into phone 16. Phone 16 is pre-programmed to understand the voice selection commands. In response to the selection command of seat 12 from the user, phone 16 generates and transmits to controller 18 a selection signal indicative of the user selection of the seat for adjusting. As shown in FIG. 3B, the user moves phone 16 into an initial orientation to select a part (e.g., seat bottom 24) or a feature (e.g., lumbar feature) of the selected object (i.e., seat 12 in this case) for adjusting. For example, the initial orientation of phone 16 corresponds to the user selecting seat bottom 24 for adjusting. The steps of FIGS. 3A and 3B in conjunction cause phone 16 and controller 18 to be synchronized such that subsequent movement of the phone by the user and/or user control input entered by the user into the phone (for example, as depicted in FIG. 4 as described below) will be interpreted for, in this example, adjusting seat bottom 24.

To confirm to the user that phone 16 and controller 18 are synchronized to adjust, in this example, seat bottom 24, controller 18 may generate an audio or haptic confirmation for the user. Such audio or haptic confirmation may alternatively be generated by phone 16 in response to the phone receiving a corresponding synchronization signal from controller via wireless communication line 20.

Figure 4:
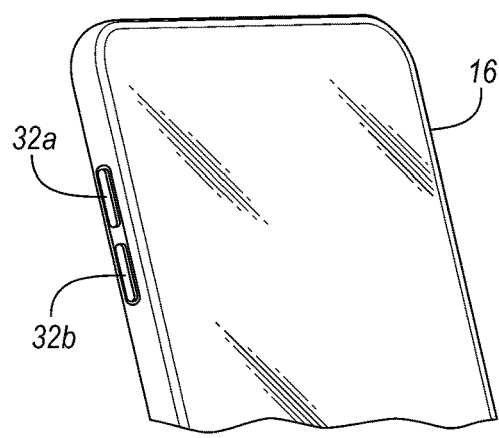
FIG. 4 illustrates a sketch depicting control buttons of the phone for the user to use to enter a user control input to have the controller adjust the selected part or feature of the selected object according to the user control input.

Referring now to FIG. 4, a sketch depicting control buttons 32a and 32b of phone 16 for the user to use to enter a user control input is shown. The user may use control buttons 32a and 32b of phone 16 to have controller adjust the selected part (e.g., seat bottom 24) or the selected feature (e.g., lumbar feature) of the selected object (e.g., seat 12) according to the user control input. In this way, the user can achieve the desired adjustment of the selected part or the selected feature. For instance, the user presses volume up control button 32a to adjust the selected part or the selected feature in one manner (e.g., tilt upward) and presses volume down control button 32b to adjust the selected part or the selected feature in the opposite manner (e.g., tilt downward).

Figure 5A:
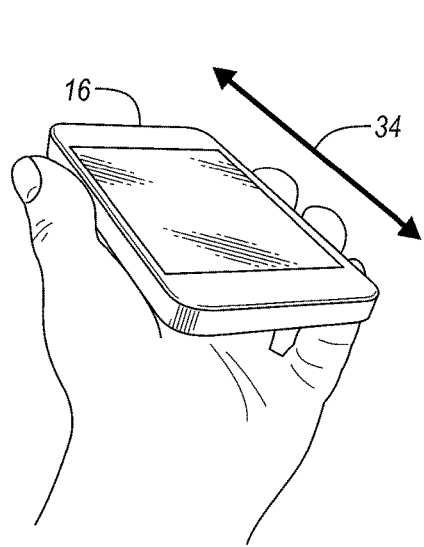
FIG. 5A illustrates a sketch depicting a step of the user moving the phone to have the controller slide the sunroof between fore and aft positions.

Referring now to FIG. 5A, a sketch depicting a step of the user moving phone 16 to have controller 18 slide sunroof 14 between fore and aft positions is shown. In this case, it is assumed that the user previously selected sunroof 14 for adjusting. The user may move phone 16 in a first direction along line 34 to have controller 18 slide sunroof 14 toward the fore position. Correspondingly, the user may move phone 16 in an opposite second direction along line 34 to have controller 18 slide sunroof 14 toward the aft position.

Figure 5B:
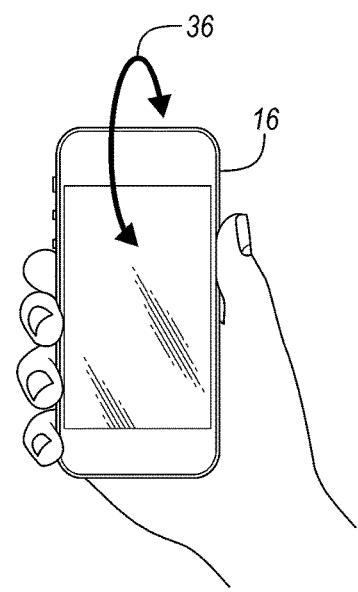
FIG. 5B illustrates a sketch depicting a step of the user moving the phone to have the controller tilt the sunroof between up and down positions.

Referring now to FIG. 5B, a sketch depicting a step of the user moving phone 16 to have controller 18 tilt sunroof 14 between up and down positions is shown. Again, it is assumed that the user previously selected sunroof 14 for adjusting. The user may tilt phone 16 in a first direction along curvature 36 to have controller 18 tilt sunroof 14 between up. Correspondingly, the user may tilt phone 16 in an opposite second direction along curvature line 36 to have controller 18 tilt sunroof 14 down.

Figure 6A:
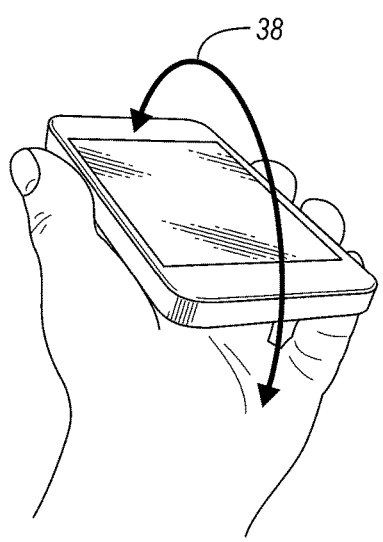
FIG. 6A illustrates a sketch depicting a step of the user moving the phone relative to a first initial orientation of the phone to have the controller adjust an adjuster up/down feature of the seat up or down.

Referring now to FIG. 6A, a sketch depicting a step of the user moving phone 16 relative to a first initial orientation of the phone to have controller 18 adjust an adjuster up/down feature of seat 12 is shown. It is assumed that the user previously selected seat 12 for adjusting. The first initial orientation is pre-defined to correspond to the user selecting the adjuster up/down feature of seat 12 for adjusting. Thus, the user initially moving phone 16 into the first initial orientation instructs controller 18 that the user selected the adjuster up/down feature of seat 12 for adjusting. The user may then tilt phone 16 upward or downward along curvature line 38 to have controller 18 adjust the adjuster feature of seat 12 upward or downward.

FIGS. 6B, 6C, 6D, and 6E follow the same format as FIG. 6A. In each case, it is assumed that the user previously selected seat 12 for adjusting.

Figure 6B:
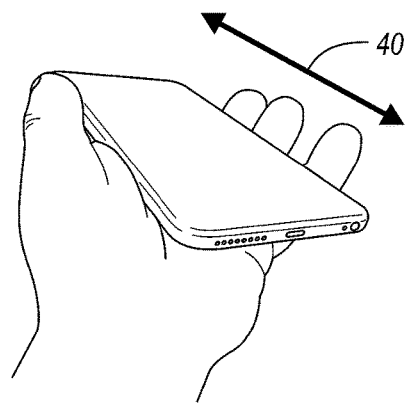
FIG. 6B illustrates a sketch depicting a step of the user moving the phone relative to a second initial orientation of the phone to have the controller adjust an adjuster fore/aft feature of the seat fore or aft.

FIG. 6B illustrates a sketch depicting a step of the user moving phone 16 relative to a second initial orientation of the phone to have controller 18 adjust an adjuster fore/aft feature of seat 12. The second initial orientation is pre-defined to correspond to the user selecting the adjuster up/down feature of seat 12 for adjusting. Thus, the user initially moving phone 16 into the second initial orientation instructs controller 18 that the user selected the adjuster fore/aft feature of seat 12 for adjusting. The user may then move phone 16 along line 40 to have controller 18 adjust the adjuster feature of seat 12 fore or aft.

Figure 6C:
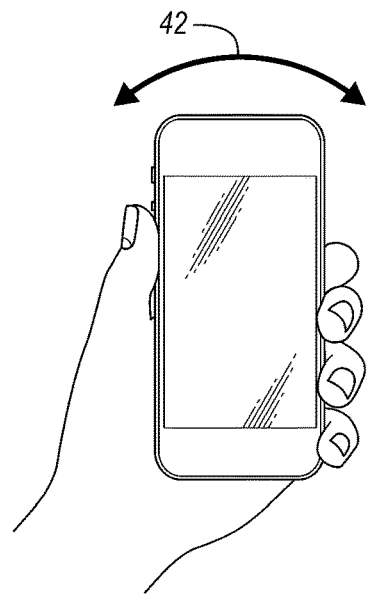
FIG. 6C illustrates a sketch depicting a step of the user moving the phone relative to a third initial orientation of the phone to have the controller adjust a lumbar forward/rearward feature of the seat forward or rearward.

FIG. 6C illustrates a sketch depicting a step of the user moving phone 16 relative to a third initial orientation of the phone to have controller 18 adjust a lumbar forward/rearward feature of seat 12. The third initial orientation is pre-defined to correspond to the user selecting the lumbar forward/rearward feature of seat 12 for adjusting. Thus, the user initially moving phone 16 into the third initial orientation instructs controller 18 that the user selected the lumbar forward/rearward feature of seat 12 for adjusting. The user may then rotate phone 16 along curvature line 42 to have controller 18 adjust the lumbar forward/rearward feature of seat 12 forward or rearward.

Figure 6D:
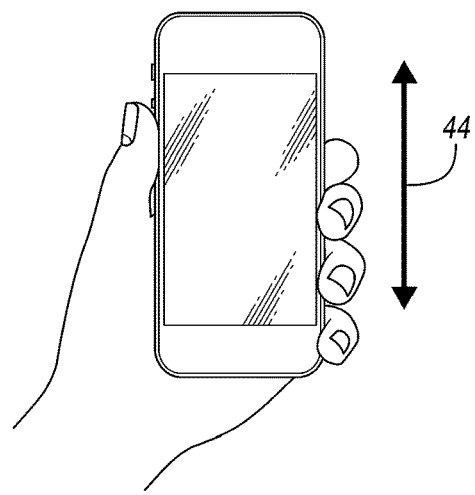
FIG. 6D illustrates a sketch depicting a step of the user moving the phone relative to a fourth initial orientation of the phone to have the controller adjust a lumbar up/down feature of the seat upward or downward.

FIG. 6D illustrates a sketch depicting a step of the user moving phone 16 relative to a fourth initial orientation of the phone to have controller 18 adjust a lumbar up/down feature of seat 12. The fourth initial orientation is pre-defined to correspond to the user selecting the lumbar up/down feature of seat 12 for adjusting. Thus, the user initially moving phone 16 into the fourth initial orientation instructs controller 18 that the user selected the lumbar up/down feature of seat 12 for adjusting. The user may then move phone 16 upward or downward along line 44 to have controller 18 adjust the lumbar up/down feature of seat 12 upward or downward.

Figure 6E:
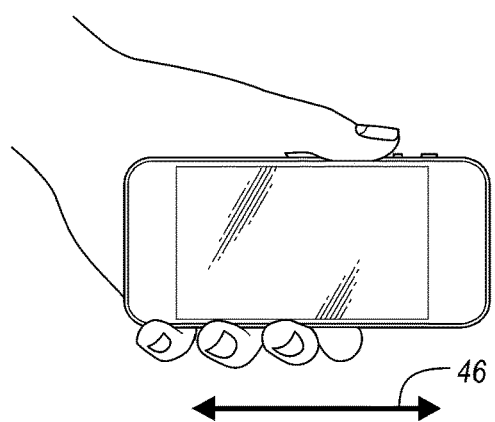
FIG. 6E illustrates a sketch depicting a step of the user moving the phone relative to a fifth initial orientation of the phone to have the controller adjust a cushion bolster in/out feature of the seat in or out.

FIG. 6E illustrates a sketch depicting a step of the user moving phone 16 relative to a fifth initial orientation of the phone to have controller 18 adjust a cushion bolster in/out feature of seat 12. The fifth initial orientation is pre-defined to correspond to the user selecting the cushion bolster in/out feature of seat 12 for adjusting. Thus, the user initially moving phone 16 into the fifth initial orientation instructs controller 18 that the user selected the cushion bolster in/out feature of seat 12 for adjusting. The user may then move phone 16 forward or rearward along line 46 to have controller 18 adjust the cushion bolster in/out feature of seat 12 in or out.

As described, methods and systems employ orientation of a phone to adjust adjustable physical objects, parts, and/or features of the objects. In embodiments, a specific initial orientation of the phone indicates a selected object (or part or feature); and movement of the phone indicates corresponding adjustment of the selected object. In other embodiments, a specific initial orientation of the phone also indicates a selected object; and input control of the phone indicates corresponding adjustment of the selected object. In other embodiments, proximity sensors may be used either in the phone or on the object (e.g., the seat) to communicate with the phone to enable the object to be selected. In these embodiments, movement of the phone indicates corresponding adjustment of the object and/or input control of the phone indicates corresponding adjustment of the object.

As further described, the adjustable physical objects may be physical objects of a vehicle such as a vehicle seat and a vehicle sunroof. However, the adjustable physical objects may be non-vehicle, physical objects such as household recliner seats and household windows. In sum, the adjustable physical objects may be any physical object (e.g., TV swivel, fan, thermostat, etc.) that is sync-able with a handheld, smart device such as the phone described herein.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system comprising:
a phone configured to transmit an orientation signal indicative of an orientation of the phone as the orientation of the phone changes;
a controller configured to receive the orientation signal from the phone and to adjust a vehicle seat in correspondence with the orientation of the phone as the orientation of the phone changes; and
wherein the orientation of the phone changes independently of the vehicle seat while the vehicle seat is being adjusted in correspondence with the orientation of the phone as the orientation of the phone changes.

2. The system of claim 1 wherein:
the controller is further configured to select one of a plurality of parts of the vehicle seat according to an initial orientation of the phone and to adjust the selected one of the parts of the vehicle seat in correspondence with the orientation of the phone as the orientation of the phone changes.

3. The system of claim 1 wherein:
the controller is further configured to select a first part of the vehicle seat when an initial orientation of the phone is in a first orientation and to adjust the first part of the vehicle seat in correspondence with the orientation of the phone as the orientation of the phone changes relative to the first orientation; and
the controller is further configured to select a second part of the vehicle seat when the initial orientation of the phone is in a second orientation and to adjust the second part of the vehicle seat in correspondence with the orientation of the phone as the orientation of the phone changes relative to the second orientation.

4. The system of claim 3 wherein the first part of the vehicle seat is a vehicle seat bottom and the second part of the vehicle seat is a vehicle seat back.

5. The system of claim 1 wherein:
the phone is further configured to transmit a selection signal indicative of a user selection of the vehicle seat; and
the controller is further configured to adjust the vehicle seat in correspondence with the orientation of the phone after receiving the selection signal indicative of the user selection of the vehicle seat.

6. The system of claim 1 wherein:
the phone is further configured to transmit a control signal indicative of a user input to the phone; and the controller is further configured to receive the control signal from the phone and adjust the vehicle seat according to the user input.

7. A method comprising:
wirelessly receiving from a phone, by a controller, an orientation signal indicative of an orientation of the phone as the orientation of the phone changes by a user physically moving the phone; and
adjusting, by the controller, a vehicle seat in correspondence with the orientation of the phone as the orientation of the phone changes by the user physically moving the phone.

8. The method of claim 7 further comprising:
selecting, by the controller, one of a plurality of parts of the vehicle seat according to an initial orientation of the phone and to adjust the selected one of the parts of the vehicle seat in correspondence with the orientation of the phone as the orientation of the phone changes.

9. The method of claim 7 further comprising:
selecting, by the controller, a first part of the vehicle seat when an initial orientation of the phone is in a first orientation and adjusting, by the controller, the first part of the vehicle seat in correspondence with the orientation of the phone as the orientation of the phone changes relative to the first orientation; and
selecting, by the controller, a second part of the vehicle seat when the initial orientation of the phone is in a second orientation and adjusting, by the controller, the second part of the vehicle seat in correspondence with the orientation of the phone as the orientation of the phone changes relative to the second orientation.

10. The method of claim 7 further comprising:
wirelessly receiving from the phone, by the controller, a selection signal indicative of a user selection of the vehicle seat; and
adjusting, by the controller, the vehicle seat in correspondence with the orientation of the phone as the orientation of the phone changes after receiving the selection signal indicative of the user selection of the vehicle seat.

11. The method of claim 7 further comprising:
wirelessly receiving from the phone, by the controller, a control signal indicative of a user input to the phone; and
adjusting, by the controller, the vehicle seat according to the user input.

12. The system of claim 1 wherein:
the orientation signal at a first time is indicative of the phone being rotated in a first rotating direction and at a second time is indicative of the phone being rotated in a second rotating direction opposite to the first rotating direction; and
the controller is further configured to tilt the vehicle seat forward in correspondence with rotation of the phone in the first rotating direction and to tilt the vehicle seat rearward in correspondence with rotation of the phone in the second rotating direction.

13. The system of claim 1 wherein:
the orientation signal at a first time is indicative of the phone being moved in a first lateral direction and at a second time is indicative of the phone being moved in a second lateral direction opposite to the first lateral direction; and
the controller is further configured to laterally move the vehicle seat forward in correspondence with movement of the phone in the first lateral direction and to laterally move the vehicle seat rearward in correspondence with movement of the phone in the second lateral direction.

14. A system comprising:
a phone configured to transmit an orientation signal indicative of an orientation of the phone;
a controller configured to receive the orientation signal from the phone and select an object for adjustment when the phone is in an initial orientation assigned to the object; and
wherein the phone is remotely located from the object and the initial orientation of the phone is independent of any orientation of the object.

15. The system of claim 14 wherein:
the controller is further configured to, after having selected the object, adjust the object in correspondence with the orientation of the phone as the orientation of the phone changes.

16. The system of claim 14 wherein:
the controller is further configured to select a first part of the object for adjustment when The phone is in a first orientation and select a different second part of the object for adjustment when the phone is in a different second orientation.

17. The system of claim 14 wherein: the object is a vehicle seat.

18. The system of claim 14 wherein: the object is a vehicle sunroof.

19. The system of claim 14 wherein:
the controller is further configured to adjust the selected part of the object in correspondence with the orientation of the phone as the orientation of the phone changes.

20. The system of claim 14 wherein.:
the phone is further configured to transmit a control signal indicative of a user input to the phone; and
the controller is further configured to receive the control signal from the phone and adjust the selected part of the object according to the user input.

* * * * *